United States Patent [19]

Bung et al.

[11] Patent Number: 5,116,924

[45] Date of Patent: May 26, 1992

[54] PAPER SIZING AGENTS CONTAINING CATIONIC DISPERSANTS

[75] Inventors: Josef Bung; Hasan Ulubay, both of Dannstadt-Schauernheim; Bernd Schutzius, Römerberg, all of Fed. Rep. of Germany

[73] Assignee: Guilini Chemie GmbH, Ludwigshafen am Rhein, Fed. Rep. of Germany

[21] Appl. No.: 548,417

[22] Filed: Jul. 5, 1990

[30] Foreign Application Priority Data

Jul. 5, 1989 [EP] European Pat. Off. ........ 89112252.5

[51] Int. Cl.⁵ ..................... C08F 26/02; C08F 226/02
[52] U.S. Cl. ................................. 526/312; 526/317.1; 526/318; 526/319; 526/329.5; 526/329.7
[58] Field of Search ............. 526/312, 318, 319, 329.5

[56] References Cited

U.S. PATENT DOCUMENTS

| | | |
|---|---|---|
| 3,385,839 | 5/1980 | Honig et al. |
| 4,636,452 | 1/1987 | Furukawa .................... 430/112 |
| 4,749,762 | 6/1988 | Foss ............................. 526/312 |

Primary Examiner—Joseph L. Schofer
Assistant Examiner—Fred Zitomer
Attorney, Agent, or Firm—Spencer, Frank & Schneider

[57] ABSTRACT

A cationic dispersant composed of a copolymer made of the monomers N,N-dimethylamino acrylate and/or methaacrylate, the acrylic acid ester and or methacrylic acid ester of a $C_{10}$ to $C_{22}$ fatty alcohol, methyl acrylate and/or methyl methacrylate, acrylic and/or methacrylic acid and optionally n-butyl acrylate and/or methacrylate and isobutyl acrylate and/or methacrylate. It is equally suitable for the production of stable sizing agent dispersions intended for internal or surface sizing.

13 Claims, No Drawings

PAPER SIZING AGENTS CONTAINING CATIONIC DISPERSANTS

CROSS REFERENCE TO RELATED APPLICATION

The present disclosure relates to the subject matter disclosed in Application No. 89112252.5 filed in the European Patent Office on Jul. 5th, 1989, the entire specification of which is incorporated herein by reference.

BACKGROUND OF THE INVENTION

1. Field of the Invention

The present invention relates to the production of the novel dispersants and the sizing agent dispersions produced therefrom which are advantageously employed for sizing paper. The invention further relates to cationic dispersants for the dispersion of sizing agents, for example rosins and/or derivatives thereof, and reactive sizing agents, for example alkyl ketene dimers, as well as cationic sizing agent dispersions containing these dispersants and possibly also aluminum sulfate.

2. Technology Review

Aqueous resin dispersions for sizing paper are known. Resin dispersions based on natural resins, e.g. rosin resins, possibly containing polymers such as starches that have been crosslinked, possibly under alkali conditions, with methyl cellulose, casein or other proteins are disclosed in many patents. For example, resin dispersions made according to the Bewoid process, are mentioned in German Patent No. 1,131,348. U.S. Pat. No. 3,955,654 describes resin dispersions produced by high pressure homogenization.

Also known are cationic dispersions of paper sizing agents in water in which cationic starches or cationic, synthetically produced polymers are usually employed as the cationically active substances. The presence of the cationically active substances considerably accelerates the sizing process.

U.S. Pat. No. 3,966,654 discloses aqueous dispersions of paper sizing agents in water which are composed of 5 to 50 weight percent of a fortified resin, 0.5 to 10 weight percent of a water-soluble cationic dispersant and water. The fortified resins employed here are primarily wood and tall oil rosins which have been reacted with compositions containing the group >C=C—C=O. The cationic dispersant may be polyamine epichlorohydrin resins, alkylene polyamine epichlorohydrin resins or polydiallylamine epichlorohydrin resins. The disadvantages of these dispersions are that their shelf life stability still leaves something to be desired.

Aqueous dispersions of finely dispersed and fortified resin sizing agents are the subject matter of U.S. Pat. No. 4,374,673 which is related to European Patent 0,056,876. Instead of the dispersants disclosed in U.S. Pat. No. 3,966,654, this process employs cationic starches as the water-soluble dispersants. Moreover, they also contain an anionic surfactant. The remainder of the dispersion is water. The dispersions employed for sizing paper can be produced either by homogenization of a solution or melt of the fortified resin in a homogenizer under pressure or according to the so-called inversion process. In the first-mentioned process, the fortified resin is initially dissolved in an organic solvent that is not water-miscible. Thereafter, the aqueous solution of a cationic dispersant and an anionic surfactant are dispersed in the solution. By homogenization in a homogenizer under pressures of 50 to 400 bar, the unstable emulsion becomes a stable emulsion. Finally, the organic solvent is removed by vacuum distillation.

Paper sizing agents based on rosin dispersions are also disclosed in European Patent Publication 200,002. In addition to rosin, which may be modified with maleic acid anhydride, fumaric acid, or a modified hydrocarbon resin, these sizing agents contain commercially available protective colloids or surfactants, polyaluminum hydroxychlorides and possibly retention, fixing agents, and/or wet-strength imparting agents. Because of their poor electrolyte stability, these dispersions tend to undergo phase separation and to thicken.

Laid-open application DE 3,737,615 discloses a resin emulsion sizing agent which is composed of a fortified resin and an at least partially quaternary copolymer composed primarily of a monomer of a (meth)acrylic acid alkyl amino alkyl ester or amide and water. An alleged advantage of this sizing agent is that, at a higher pH, in harder water and at a higher temperature (that is, under conditions in which the conventional anionic sizing agents no longer perform efficiently) it has a good sizing effect. This sizing agent is, however, incompatible with acid aluminum salts.

It is therefore an object of the present invention to provide stable sizing agent dispersions for sizing in the neutral and weakly alkali range which are suitable for internal sizing or only the surface, are additionally well compatible with aluminum sulfate and can be manufactured economically without the need for an expensive stirring assembly or other apparatus.

SUMMARY OF THE INVENTION

It was possible to solve this problem in a surprising manner with new sizing agent dispersions containing a novel cationic dispersant, preferably in the form of an aqueous colloidal polymer salt produced from monomers (a) through (f):

(a) 10 to 30 weight % N,N-dimethylaminoethyl acrylate and/or methacrylate;

(b) 5 to 30 weight % of an acrylic and/or methacrylic acid ester of a $C_{10}$ to $C_{22}$ fatty alcohol;

(c) 10 to 60 weight % methyl acrylate and/or methacrylate;

(d) 0 to 60 weight % butyl acrylate and/or butyl methacrylate;

(e) 0 to 60 weight % isobutyl acrylate and/or isobutyl methacrylate;

(f) 3 to 15 weight % acrylic acid and/or methacrylic acid;

with the sum of components (a) through (f) always being 100%.

The novel cationic dispersant, which disperses the rosin and/or its derivatives or the alkyl ketene dimer, is a copolymer which is able to also function solely as a sizing agent, if required.

The cationic dispersant may also be present as a polymer salt in the form of an aqueous colloidal solution. This form is preferred for the manufacture of the novel sizing agent dispersions.

The nitrogen content of the copolymer is 100 to 250 mMole per 100 g of the sum of the weights of monomers (a) through (f). The salt of the copolymer may be the salt of either an inorganic or an organic acid. Formic acid and acetic acid are particularly suitable for the salt formation.

DETAILED DESCRIPTION OF THE PREFERRED EMBODIMENTS

The novel cationic dispersant can be obtained by a radically initiated polymerization in solvent of monomers (a) through (f). The solvent is an organic solvent that is miscible with water, in which monomers (a) through (f) as well as the resulting copolymer dissolve. Preferably, isopropanol is employed. The solvent polymerization is performed in a reactor into which monomers (a) through (f) are fed at room temperature. The monomer mixture of the examples is stirred at 120 to 160 rpm. Stirring continues for about 10 minutes in an inert gas atmosphere. Thereafter, the radical initiator dispersed in isopropanol is added. The reaction temperature is set to reach about 80° C. within 20 minutes and then the influx of inert gas is interrupted. After about 70 minutes, the polymerization is completed. Neutralization with acid is advantageously performed immediately after the end of polymerization. The resulting salt of the copolymer can be converted to a colloidal solution by the addition of demineralized water.

The novel cationic sizing agent dispersion is composed of the dispersant and a sizing agent and possibly aluminum sulfate. The sizing agent according to the present invention is understood to include a reactive sizing agent of the alkyl ketene dimer type as well as a rosin resin or a derivative thereof. The known rosin resins employed are primarily natural rosins, such as wood rosin, gum rosin and tall oil rosin and the rosin derivatives employed are natural rosins modified with maleic acid anhydride and/or fumaric acid, also known as fortified resins. These rosin derivatives may also be mixed with non-fortified resins. Or, rosin derivatives resulting from the esterification of rosin with polyalcohols, such as glycerin and pentaerythritol can be employed.

In a particular manner, the novel sizing agent dispersion may also be combined with aluminum salts. Surprisingly this does not result in flocculation or precipitation if aluminum salts are added to the finished dispersion. According to the present invention, solid or dissolved aluminum salts are added to the finished dispersion while stirring slowly. The quantity of aluminum salts added to the sizing agent dispersion in solid or dissolved form ranges from 0 to 15 weight %, preferably from 5 to 10 weight %, relative to the finished dispersion.

Suitable aluminum salts according to the invention are, for example, aluminum sulfate, aluminum formate, aluminum chloride and polyaluminum chloride and other basic aluminum salts.

The sizing agent dispersions according to the present invention can advantageously also be produced by the inversion method in such a manner that the polymer dispersant is reacted directly with the respective sizing agent in the same reactor in which it was produced. A solution or a melt of, for example, the rosin is added, according to the present invention, to the alcoholic solution of the dispersant under intensive stirring at elevated temperature, particularly at 75° to 85° C. A homogeneous mixture is formed which is converted into an oil-in-water emulsion by the gradual addition of warm water having a temperature from 75° to 85° C. If required, aluminum salts dissolved in water or solid aluminum salts may be added to this emulsion. The weight ratio of dispersant to sizing agent is 1:1 to 1:20, particularly 1:7 to 1:12.

This sizing agent dispersion, containing, for example, aluminum sulfate, can be used immediately for sizing paper. A separate addition of aluminum sulfate is no longer necessary.

The dispersing effect of the novel cationic dispersant on rosin and alkyl ketene dimer, and its compatibility with aluminum salts could not be derived from the prior art and was therefore even more surprising.

During the so-called phase reversal emulsification, a spontaneous decrease in viscosity occurs. After cooling of the oil-in-water emulsion, a white, thin-flowing dispersion is available. Its average particle size is less than 0.5 microns.

Another procedure for producing the cationic sizing agent is that the dispersant is added to the sizing agent, present as a melt or a solution, in the form of a colloidal, aqueous solution and is converted by the subsequent addition of demineralized water and stirring into an oil-in-water emulsion and is thereby dispersed. Solid or dissolved aluminum salts are then added to the resulting sizing agent dispersion. Thus, a stable sizing agent dispersion results from which the organic solvent can be removed by distillation under reduced pressure.

In this process variation, the ratio of dispersant to sizing agent is from about 1:1 to about 1:20, and particularly from about 1:7 to about 1:12.

The examples below serve to demonstrate the production of the novel cationic dispersant and then the production of the sizing agent dispersions according to the present invention and their use for sizing paper. The examples are given for illustrative purposes only and they are not intended to limit the scope of the invention.

EXAMPLE 1

An externally heatable double-wall flask having a 500 ml volume is used as the reaction vessel. It is equipped with a stirrer, reflex condenser, thermometer, gas inlet, bubble counter and drip funnel with gas equalization. At room temperature, the following are successively added to the flask:

20.0 g isopropanol 32.0 g methyl methacrylate (0.32 Mole)

16.5 g methacrylic acid ester of a $C_{16}$-$C_{18}$ fatty alcohol (0.05 Mole)

15.7 g N,N-dimethylaminoethyl methacrylate (0.01 Mole)

2.5 g acrylic acid (0.035 Mole)

The homogeneous mixture is stirred at a stirrer rate of 150 rpm and is rinsed for 10 minutes in an inert gas, e.g. nitrogen.

Then 0.25 g azobisisobutyronitrile, dispersed in 5 g isopropanol, are added. The temperature is raised to 80° C. over 20 minutes and once this temperature has been reached, the supply of nitrogen is cut off. Copolymerization of the monomers begins and reaches the desired degree of polymerization after about 70 minutes (K-value of 12 in dimethylformamide at 25° C. and 1.0 g per 100 ml).

The substance is neutralized with 10 g of a 98% formic acid solution. The polymer salt can be dispersed within 10 minutes by the addition of 315 g hot, demineralized water. The temperature of the water is around 80° C.

If the dispersion was made in water, an almost colorless, weakly opalescent colloidal solution results which has a solids content of 16.0 weight %. The viscosity of the solution, measured according to a Brookfield viscometer with an H-i spindle rotating at 50 rpm is 15 mPa·s. The content of neutralized nitrogen is 150 mMole per 100 g copolymer.

EXAMPLE 2

The procedure is the same as in Example 1, but instead of formic acid, 10.25 g of a 32% hydrochloric acid solution (0.09 Mole) are employed for the neutralization. The resulting solution is light, weakly opalescent and has a viscosity of 20 mPa·s. The pH of this polymer solution is 4.0.

Examples 3 to 5 which are listed in Table 1 below relate to further copolymer compositions which were produced according to the method described in Example 1.

TABLE 1

| Component* | Example | | |
|---|---|---|---|
| | 3 | 4 | 5 |
| isopropanol | 25 | 20 | 20 |
| methyl methacrylate | 25.1 | 28 | 32 |
| $C_{12}$-$C_{14}$ methacrylate | 57.6 | — | — |
| $C_{16}$-$C_{18}$ methacrylate | — | 18.5 | 16.5 |
| N,N-dimethyl amino ethyl methacrylate | 21.5 | 18 | 15.7 |
| acrylic acid | 10.8 | — | 2.5 |
| methacrylic acid | — | 7.0 | — |
| azobisisobutyronitrile | 0.30 | 0.25 | 0.25 |
| formic acid | 17.0 | — | 4.6 |
| hydrochloric acid, 32% | — | 11.8 | — |
| water, demineralized | 58.5 | 243 | 325 |
| solids (weight %) | 16 | 18 | 16 |
| mMole 10% g copolymer | 135 | 160 | 150 |
| appearance | slightly turbid | bright & clear | slightly turbid |
| viscosity (mPa·s) | 45 | 10 | 20 |

*Unless otherwise indicated, all values are given in grams

Examples 6 and 7 show the advantages which are realized if the copolymer of the invention is employed as the sole sizing agent.

Regarding the measured values employed, the following explanations:

(1) The degree of sizing is determined relative to ink with a sizing tester of type PLG-e made by Schröder, Weinheim, as specified in its operating instructions. What is measured is the time, in seconds, that expired after contact with the testing ink until remission drops to 80% and 50%, respectively, of the remission value of the paper being tested.

Testing ink: paper testing ink, blue, according to DIN [German Industrial Standard] 53126.

(2) The Cobb value according to DIN 53132 indicates the water absorption of the paper or cardboard in grams per square meter after contact with distilled water for a certain period of time (1 minute, 5 minutes or 30 minutes). The better the sizing effect, the lower the Cobb value.

EXAMPLE 6

An unsized raw paper, produced from 100 weight % bleached coniferous wood sulfate cellulose having a grams per square meter (gsm) substance value of 50 is impregnated in a laboratory sizing press made by Einlehner with a sizing liquid which is composed of 5% enzymatically decomposed wheat starch and 8 g sizing agent per liter of this starch solution, with the sizing agent being produced according to Example 1 or 3. The paper is then dried for 2 minutes at 100° C. in a photodryer type 64/60 J made by Gerster, Bruchsal. In the sizing press, the paper takes up 4.5 weight % of dry substance.

Under the same conditions, surface sizing is performed with a sizing liquid composed of a commercially available sizing agent based on a copolymer of styrene, butyl acrylate and vinylimidazole having a solids content of 20.5 weight %.

The properties measured in the paper are compiled in Table 2.

TABLE 2

| | Commercially available product* | Polymer solution according to the invention** | |
|---|---|---|---|
| | | Example 1 | Example 3 |
| Degree of sizing | 154 | 804 | 1150 |
| Water 1 minute (Cobb value) | 29 | 25 | 21 |

*20.5 wt % solids
**16 wt % solids

This compilation shows the improved sizing effect of the products according to the present invention. Also, the improved sizing effect occurs with smaller percentages of active substances.

EXAMPLE 7

A filter paperboard made by Macherey & Nagel of Düren according to DIN 53106 and having a gsm substance value of 270 is impregnated with a sizing liquid composed of 5% enzymatically decomposed wheat starch and 0.06, 0.08 or 0.1 weight % atro, respectively, of polymer solution produced according to Example 1 or 5. "% atro" pertains to the absolute content of active ingredients in the aqueous dispersion of the sizing agent and indicates the amount of dispersion absolutely present in a given amount of dry pulp. The temperature of the sizing liquid is 60° C. The commercially available sizing agent based on a copolymer of styrene, butylacrylate and vinylimidazole listed in Table 2, is used for comparison. The impregnation is effected as follows: The paperboard cut to DIN A4 size is saturated with the sizing liquid for 10 seconds in a tray having a capacity of 1.5 liter, is then pressed between other filter paperboard by means of a hard rubber roller and then dried for 4 minutes at 100° C. in a photodryer made by Gerster/Bruchsal. The increase in weight of the cardboard was 5.7% (starch + polymer). The following values, listed in Table 3, were measured at the thus sized cardboard:

TABLE 3

| | Commercially available product | | | Polymer solution according to the invention | | | | | |
|---|---|---|---|---|---|---|---|---|---|
| | | | | Example 1 | | | Example 5 | | |
| quantity % atro** | 0.06 | 0.08 | 0.1 | 0.06 | 0.08 | 0.1 | 0.06 | 0.08 | 0.1 |
| Cobb value* | 320 | 94 | 92 | 108 | 95 | 87 | 100 | 90 | 83 |

*active period of water 30 minutes
**% are based on the dry weight of the pulp

EXAMPLE 8

The copolymerization is performed as in Example 1. The following ingredients are added in succession:
125.6 g isopropanol
50.8 g N,N-dimethylaminoethyl acrylate
67.0 g methyl methacrylate
46.0 g methacrylester of a $C_{16}$-$C_{18}$ fatty alcohol
5.8 g acrylic acid
0.6 g azobisisobutyronitrile The temperature during the polymerization is round 82° C. and the reaction time is 90 minutes. The viscosity of the solution at the end of the polymerization is 6000 mPa·s.

Neutralization is effected with 26.2 g of a 98% formic acid solution. Then 678 g demineralized water having a temperature of 80° C. is added to the resulting copolymer salt during a period of 15 minutes. A homogeneous colloidal solution results which has a solids content of 16.8 weight %. The viscosity of the solution, measured with a Brookfield viscometer with an H-1 spindle rotating at 50 rpm, is 260 mPa·s and the density of the solution is 1.02 g/cm³.

The following examples describe the production of dispersions according to the invention and their advantageous uses.

EXAMPLE 9

The container described in Example 1 is employed as reactor. The vessel is supplied with 250 g moleten wood rosin and this is heated to 100° C. Stirring for a maximum period of 10 minutes. 170 g of the colloidal dispersant produced in Example 8 are added in measured quantities to the heated wood rosin. The result is a slightly yellow water-in-oil emulsion. Then. within 15 minutes, 380 g demineralized water are added to the water-in-oil emulsion with a stir rate of 600 to 800 rpm. During the addition of the water, a phase reversal occurred and an oil-in-water emulsion was formed. Finally, 200 g of an aluminum sulfate solution having an equivalent $Al_2O_3$ content of 8 weight % was added to the emulsion.

The end product is a stable, dispersion of fine particulates which is particularly suitable for the overall sizing the entire paper substance as will be demonstrated below.

The properties of the sizing agent dispersion according to the present invention were the following:
solids content: 35.0 weight %
viscosity: 15 mPa·s
pH: 3.0
particle size: 320 nm

EXAMPLE 10

An indirectly heatable double-wall flask having a 1000 ml volume is used as the reaction and dispersion vessel. It is equipped with a stirrer, reflux condenser, thermometer, gas inlet and drip funnel. The following are successively filled into this vessel at room temperature:
35.0 g isopropanol
15.7 g N,N-dimethylaminoethyl acrylate
32.0 g methyl methacrylate
16.6 g methacrylic acid ester of a $C_{16}$ to $C_{18}$ fatty alcohol
2.5 g acrylic The mixture is stirred at about 150 rpm and is rinsed with nitrogen. Next, 0.25 g azobisisobutyronitrile are added. The mixture is heated to 80° C. in 20 minutes. Then the supply of nitrogen is shut off. The copolymerization of the monomers begins spontaneously and reaches the desired degree of polymerization after about 70 minutes. The resulting solution is neutralized with 6.9 g formic acid.

Next, 250 g wood rosin heated to 90° C., in the molten state, and 20 g isopropanol are stirred into the polymer salt solution. The polymer salt solution and the natural resin form a homogeneous mixture. 675 g of demineralized water that has a temperature range of 80° to 85° C. is slowly and continuously added. The addition of water is completed after 20 minutes. The end product is an oil-in-water emulsion. During the addition of water, an increase in viscosity is initially noted. After the addition of about two thirds of the intended quantity of water, the primarily produced water-in-oil emulsion is converted to an oil-in-water emulsion. A spontaneous drop in viscosity is noted at the point of reversal. It is advisable for the rate of stirring to be adapted to the change in viscosity. At the end of the addition of water, the emulsion is cooled to room temperature over a period of 20 minutes.

The resulting product is a white, thin-flowing rosin dispersion which has an average particle size of 300 nm and a total solids content of 30.2 weight %, with a pH of 5.0 and a viscosity of 28 mPa·s.

According to a special process variation, part of the remaining quantity of water at the end of the phase reversal may also be exchanged for solutions of salts, polyelectrolytes and other substances. Type and quantity of the exchange liquid are always adapted to the desired effect. For example, in rosin dispersions, the remaining quantity of water may be exchange for an aluminum sulfate solution or, in ketene dimer dispersions, for a cationic polyelectrolyte solution.

Table 4 below lists Examples 10 to 17, which describe the subject matter of the present invention in even greater detail.

TABLE 4

| Component (grams) | Example | | | | | | | |
|---|---|---|---|---|---|---|---|---|
| | 10 | 11 | 12 | 13 | 14 | 15 | 16 | 17 |
| isopropanol | 70 | 55 | 13.5 | 27 | 30 | 55 | 27 | 45 |
| N,N'-dimethylaminoethyl acrylate | 16 | 20.4 | 8.1 | 9.1 | 16.3 | 15.7 | 10.2 | 15.7 |
| acrylic acid | 2.5 | 2.5 | 0.9 | 1.2 | 2.1 | 2.5 | 1.3 | 2.5 |
| $C_{16}$–$C_{18}$ methacrylate | 16.5 | 16.5 | 7.3 | 8 | 13.2 | 16.5 | 8.3 | 16.5 |
| methylmethacrylate | 32 | 32 | 10.7 | 15.4 | 25.6 | 32 | 16 | 32 |
| azobisisobutyronitrile | 0.25 | 0.25 | 0.10 | 0.12 | 0.20 | 0.25 | 0.12 | 0.25 |
| hydrochloric acid 98% | 11.4 | | | | 8.9 | 11.4 | | 8.6 |
| formic acid 98% | | 9 | 3.5 | 4 | | | 4.5 | |
| demineralized water | 1030 | 600 | 618 | 591 | 640 | 314 | 545 | 1033 |
| wood rosin | 300 | 250 | 250 | 250 | | | 250 | |
| rosin ester* | | | | | 160 | | | |
| stearyl ketone dimer | | | | | | 120 | | 200 |
| aluminum sulfate solution (including 8% $Al_2O_3$) | | 300 | | | | | 300 | |
| solids content in weight % | 25 | 32.5 | 30.8 | 31.8 | 24.2 | 33 | 31.5 | 20 |
| pH | 3 | 3 | 3.4 | 3.4 | 2.8 | 2.9 | 2.8 | 3.2 |
| particle size in nm | 220 | 170 | 340 | 370 | 190 | 320 | 320 | 440 |

TABLE 4-continued

| Component (grams) | Example | | | | | | |
|---|---|---|---|---|---|---|---|
| | 10 | 11 | 12 | 13 | 14 | 15 | 16 | 17 |
| viscosity in mPa·s | 5 | 10 | 10 | 8 | 5 | 25 | 12 | 18 |

*glycerin ester of a wood rosin having an acid number of 8

EXAMPLE 18

A cardboard was fabricated of 100% recycled paper (50% newsprint and 50% department store waste) on a Kämmerer experimental paper machine to a gsm substance value of 200. The stock consistency was 1.2 weight %. The dilution of the dispersion before applying it to the stock goes up to 0.48%. The dilution was done with backwater. In the machine tub, 0.35% (with reference to the dry substance of the recycled paper) of 20 weight % calcium carbonate of type DX 1, made by Omya GmbH Manufacturing conditions were:
concentration of solids in machine tub: 1.2%
concentration of solids upon contact with substance: 0.28%
gsm basis weight value: 80
stock temperature: 35° C.

Type and quantity of the added auxiliary agents and the resulting sizing values are listed in Table 6.

TABLE 6

| Sizing agent | Example 10 | | | | Example 13 | | | | Example 18 of DE-OS 3.737.615 | | | | Commercially available product as in Example 18 | | | |
|---|---|---|---|---|---|---|---|---|---|---|---|---|---|---|---|---|
| starting weight % atro* | 0.6 | 0.6 | 0.75 | 0.75 | 0.6 | 0.6 | 0.75 | 0.75 | 0.6 | 0.6 | 0.75 | 0.75 | 0.6 | 0.6 | 0.75 | 0.75 |
| starch % | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| retention agent % cationic polyacrylamide aluminum sulfate (weight %) | 0.015 | 0.015 | 0.015 | 0.015 | 0.015 | 0.015 | 0.015 | 0.015 | 0.015 | 0.015 | 0.015 | 0.015 | 0.015 | 0.015 | 0.015 | 0.015 |
| 17-18% Al$_2$O$_3$ | — | 0.4 | — | 0.4 | — | 0.4 | — | 0.4 | — | 0.4 | — | 0.4 | — | 0.4 | — | 0.4 |
| pH | 7.3 | 7.1 | 7.2 | 7.0 | 7.3 | 7.1 | 7.2 | 7.0 | 7.5 | 7.3 | 7.5 | 7.3 | 7.5 | 7.3 | 7.5 | 7.3 |
| Cobb value water 60 sec | 36 | 31 | 28 | 23 | 36 | 32 | 27 | 23 | 115 | 95 | 115 | 86 | 120 | 115 | 120 | 100 |
| sizing degree ml. seconds | 210 | 405 | 450 | 640 | 200 | 320 | 470 | 560 | 1 | 10 | 2 | 25 | 0 | 1 | 0 | 6 |

*based on the dry weight of the pulp a cationic starch (Hi-cat 100 ®, made by Roquette) were added to the suspension. The sizing agents were continuously added to the substance stream in measured quantities. The pH of the system was measured at the headbox. The temperature of the substance at the headbox was about 35° C. Test samples taken from the dried paper panel had a residual moisture content of 4 to 5% and were examined, after 24 hours of exposure to 23° C. and 55% relative humidity, as to their degree of sizing. Type and quantity of the added auxiliary substances and the resulting sizing values are compiled in Table 5.

EXAMPLE 20

A paper was produced under otherwise the same conditions as in Example 19, except ketene dimer dispersions according to the invention were employed as sizing agents. Type and quantity of the added auxiliary agents as well as the resulting sizing values are compiled in Table 7.

TABLE 7

The other listed auxiliary agents correspond to those of Table 6.

TABLE 5

| Sizing Agent | Example 10 | | | | Example 8 | | | | Comparison Example 1* | | | | Commercial product** as in Example 18 | | |
|---|---|---|---|---|---|---|---|---|---|---|---|---|---|---|---|
| starting weight % atro* | 0.5 | 0.5 | 0.75 | 0.75 | 0.5 | 0.5 | 0.75 | 0.75 | 0.5 | 0.5 | 0.75 | 0.75 | 0.5 | 0.5 | 0.75 | 0.75 |
| retention agent*** | 0.02 | 0.02 | 0.02 | 0.02 | 0.02 | 0.02 | 0.02 | 0.02 | 0.02 | 0.02 | 0.02 | 0.02 | 0.5 | 0.5 | 0.75 | 0.75 |
| aluminum sulfate (weight %)**** | — | 0.03 | — | 0.3 | — | 0.3 | — | 0.3 | — | 0.3 | — | 0.3 | — | 0.3 | — | 0.3 |
| pH (point of contact) | 7.6 | 7.4 | 7.6 | 7.3 | 7.4 | 7.2 | 7.2 | 7.0 | 7.6 | 7.4 | 7.6 | 7.4 | 7.6 | 7.4 | 7.5 | 7.3 |
| Cobb value water 60 sec | 170 | 125 | 120 | 95 | 92 | 83 | 58 | 46 | 260 | 190 | 210 | 145 | 260 | 250 | 260 | 220 |

*according to Example 18 of DE-OS 3.737.615
**commercially available rosin dispersion including casein as a protective colloid
***cationic polyacrylamide, type 4632 SC made by Nalco
****commercially available product containing 17-18% Al$_2$O$_3$
* % size based on the dry weight of the pulp

EXAMPLE 19

In the same manner as described for Example 18, a paper is produced which has the following composition:
40 weight % pine sulfate cellulose
40 weight % beech sulfite cellulose

| Sizing agent | Example 15 | | Example 17 | | Commercial Product* | |
|---|---|---|---|---|---|---|
| starting weight % atro*** | 0.15 | 0.20 | 0.15 | 0.20 | 0.15 | 0.20 |
| starch % | 0.35 | 0.35 | 0.35 | 0.35 | 0.35 | 0.35 |
| retention | 0.02 | 0.02 | 0.02 | 0.02 | 0.02 | 0.02 |

TABLE 7-continued

The other listed auxiliary agents correspond to those of Table 6

| Sizing agent | Example 15 | Example 17 | | | | Commercial Product* |
|---|---|---|---|---|---|---|
| agent G | | | | | | |
| filler content in paper % | 17.4 | 17.0 | 17.3 | 16.9 | 17.3 | 17.0 |
| Cobb value A** | 29 | 24 | 31 | 25 | 47 | 38 |
| Cobb value B** | 21 | 19 | 22 | 19 | 23 | 19 |
| degree of sizing A - 80% remission | 720 | 980 | 640 | 940 | 200 | 280 |
| degree of sizing B 80% remission | 2400 | 3300 | 1800 | 2950 | 2050 | 3000 |

*Commercially available merchandise including 6% ketene dimer, total solids including emulsifying agents (starch, tenside) 12 weight %
**Test result A was directly after manufacture of the paper
Test result B was determined after 96 hours of acclimatization at 23° C. and 55% relative humidity
***based on the dry weight of the pulp From the results listed in the above table it is clearly evident that the sizing agents according to the present invention produce a significantly improved instant sizing. Thus, the manufactured paper is available for further processing after a shorter storage time, resulting in a significant economic advantage.

It will be understood that the above description of the present invention is susceptible to various modifications, changes and adaptations, and the same are intended to be included within the meaning and range of equivalents of the appended claims.

What is claimed is:

1. In a cationic dispersant the improvement comprising a copolymer obtained by the reaction of monomers:
   (a) 10 to 30 weight % of a member of the group consisting of N,N-dimethylaminoethyl acrylate and N,N-dimethylaminoethyl methacrylate;
   (b) 5 to 30 weight % of a member of the group consisting of acrylic acid ester and methacrylic acid ester of a $C_{10}$ to $C_{22}$ fatty alcohol;
   (c) 10 to 60 weight % of a member of the group consisting of methyl acrylate and methyl methacrylate;
   (d) 0 to 60 weight % of a member of the group consisting of n-butyl acrylate and n-butyl methacrylate;
   (e) 0 to 60 weight % of a member of the group consisting of isobutyl acrylate and isobutyl methacrylate;
   (f) 3 to 15 weight % of a member of the group consisting of acrylic acid and methacrylic acid;
with the sum of said monomers being 100%.

2. A salt of the copolymer of claim 1.

3. The cationic dispersant as defined in claim 1, including at least one member of the group consisting of n-butyl acrylate and n-butyl methacrylate.

4. The cationic dispersant as defined in claim 1, including at least one member of the group consisting of isobutyl acrylate and isobutyl methacrylate.

5. A cationic dispersant comprising an aqueous colloidal solution of the salt defined in claim 2.

6. A cationic dispersant as defined in claim 1, wherein the nitrogen content is 100 to 250 mole per 100 g of the sum weight of the monomers.

7. A salt as defined in claim 2, wherein the anion of the salt is an anion of an inorganic acid.

8. A salt as defined in claim 2, wherein the anion of the salt is $Cl^-$.

9. A salt as defined in claim 2, wherein the anion of the salt is an organic functional group.

10. A salt as defined in claim 2, wherein the anion of the salt is a member of the group consisting of formate and acetate.

11. A method of producing the cationic dispersant, comprising the steps of polymerizing
   (a) 10 to 30 weight % of a member of the group consisting of N,N-dimethylaminoethyl acrylate and N,N-dimethylaminoethyl methacrylate;
   (b) 5 to 30 weight % of a member of the group consisting of acrylic acid ester and methacrylic acid ester of a $C_{10}$ to $C_{22}$ fatty alcohol;
   (c) 10 to 60 weight % of a member of the group consisting of methyl acrylate and methyl methacrylate;
   (d) 0 to 60 weight % of a member of the group consisting of n-butyl acrylate and n-butyl methacrylate;
   (e) 0 to 60 weight % of a member of the group consisting of isobutyl acrylate and isobutyl methacrylate;
   (f) 3 to 15 weight % of a member of the group consisting of acrylic acid and methacrylic acid;
with the sum of the monomers being 100%, using a radical initiator in an organic solvent that is miscible with water.

12. A method of producing a cationic dispersant as defined in claim 11, wherein the organic solvent is isopropanol.

13. A method of producing a cationic dispersant as defined in claim 11, further comprising neutralizing the resulting copolymer with an acid and dissolving the resulting salt of the copolymer in demineralized water, whereby a colloidal solution of said cationic dispersant is formed.

* * * * *